Aug. 24, 1948.          C. EISLER          2,447,570
BELLOWS CLAMP
Filed Feb. 24, 1945
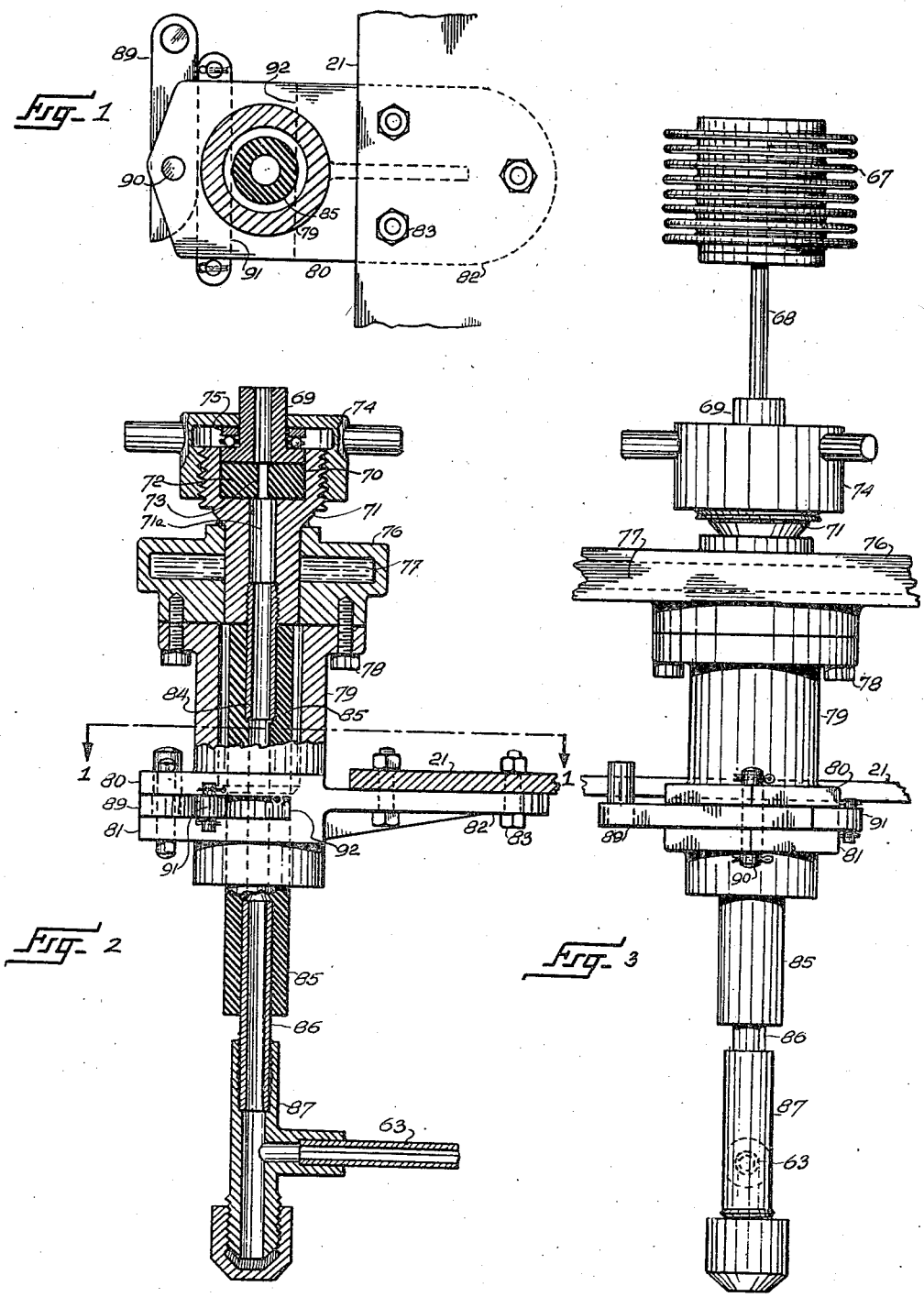
INVENTOR
CHARLES EISLER
by
ATTORNEY Patented Aug. 24, 1948

2,447,570

UNITED STATES PATENT OFFICE 2,447,570

BELLOWS CLAMP

Charles Eisler, South Orange, N. J.

Original application March 30, 1944, Serial No. 528,813. Divided and this application February 24, 1945, Serial No. 579,675

1 Claim. (Cl. 285—122)

This application is filed as a divisional application in compliance with the requirement for division in my copending application, Serial No. 528,813, filed March 30, 1944, now abandoned. The benefit of the filing date of the last mentioned application is claimed for this application.

The object of the invention described and claimed in the present application is to clamp bellows for the purpose of, for example, enabling them to be filled in a sequence of operations, and to be sealed for use in thermostatic control devices and similar installations. The filling and sealing means may be such as are described in my said copending application, Serial No. 528,813, or may be any other means with which the clamp herein described may be conveniently used or is adapted for use. The clamp may be used to secure bellows or other objects in a machine or system for any other purpose, within the scope of the present application. The term "bellows" as used in this application, shall be deemed to mean an expansible object adapted to be filled with a gas, or any other object adapted to be filled with a gas, vapor or solid.

These and other advantageous objects, which will later appear, are accomplished by the simple and practical construction and combination of parts hereinafter described and more particularly shown in the drawings, illustrating an embodiment of my invention, and in which:

Fig. 1 is a partly sectional top plan view of a device embodying my invention, taken on line 1—1 of Fig. 2, in the direction of the arrows, Fig. 2 is an elevational, partly sectional view thereof, and Fig. 3 is a vertical elevational view of the device with a bellows shown positioned therein.

The device forming the subject matter of this application is adapted to be used in connection with bellows and similar devices, as for example, exemplified in the bellows 67 shown in Fig. 3, said bellows having an exhaust tube 68 inserted in a clamp, which is embodied in the nipple 69 slidable in the cup 70 of the holder head 71. The nipple rests on the disc 72, preferably of resilient material such as rubber, provided with a central hole 73, by which the tube 68 is firmly gripped when the disc is compressed by the nut member 74. Ball bearings 75 or other anti-friction devices are interposed between the nut and the nipple to prevent rotation of the nipple and attendant twisting of the disc 72 in using the device. The holder heads 71 are brazed in water-cooling manifolds 76 which have the interior channel 77 for circulation of the cooling water.

Manifolds 76 are secured by bolts 78 to the flange of the holder sleeve 79 which has integral with it the spaced plates 80 and 81 and bracket plate 82 which is secured to spider 21 of a machine or other member to which the device of my invention is secured by bolts 83.

Into the holder head duct 71a is screwed the tube 84, the lower end of which is inserted into the thick-walled tube 85, preferably of rubber or similar material, which, through sleeves 86 and elbow 87, communicates with duct 63 of the valve mechanism for filling the bellows, such as shown in my said copending application, Serial No. 528,813. When, necessary because of leakage or for any other reason, the operator may immediately close the connection between the bellows and the valve or other member with which the bellows is connected by the duct 63, by turning the lever 89, pivoted on bolt 90, which forces the transverse bar 91, movable between plates 80 and 81, against the tube 85, which, is thereby constricted between the bar and the wall 92 of the spaced plates 80 and 81.

It will thus be seen that I have provided a bellows clamp having a tube 85, the ends of which are fitted with connecting sleeves 84 and 86 for respective connection with the bellows-holding head 71 and the duct 63 of the valve mechanism such as shown in Figs. 4 and 4b of my said copending application, Serial No. 518,813. The medial section of the tube 85 intermediate the ends of the sleeves 84 and 86 therein, is compressible, as by the lever 89 above described, whereby the axial internal aperture of the tube 85 may be closed at the will of the operator to break the connection between the bellows and valve mechanism. The bellows clamp of the instant invention, as above described, is used to clamp bellows for the purpose of enabling them to be filled in the sequence of sealing operations for use in thermostatic control devices and similar installations. In the filling of such bellows, they are subjected to flushing and exhausting operations which are preferably carried out while the bellows are heated. The heated bellows are cooled by water circulating through the cooling manifold 76, having the interior channels 77 through which water is circulated in any suitable or desired manner.

Having thus described my invention what I claim as new and desire to secure by Letters Patent, is:

In a bellows clamp for holding a bellows during the operation of exhausting and filling the same, wherein said bellows may be subjected to a heating operation to facilitate exhausting and filling the same, a holder head having an open top cup formed on its upper end and being externally threaded, a resilient disc seated in said cup, a bellows exhaust tube receiving nipple having a flanged lower end seated on said disc within the top of the cup, an internally threaded cap secured on the threaded upper end of the holder head, the top of the cap being formed with a central opening through which said nipple extends, a bearing interposed between the top of the cap and the upper face of the flange on said nipple, and a manifold to which said holder head is secured, said manifold having an interior channel for cooling purposes.

CHARLES EISLER.

REFERENCES CITED

The following references are of record in the file of this patent:

UNITED STATES PATENTS

| Number | Name | Date |
|---|---|---|
| 502,003 | Jeffery | July 25, 1893 |
| 833,784 | Hicks | Oct. 23, 1906 |
| 1,657,663 | Devereux | Jan. 31, 1928 |
| 1,735,637 | Cohen | Nov. 12, 1929 |
| 2,146,917 | Rosenberger | Feb. 14, 1939 |
| 2,167,952 | Jordan | Aug. 1, 1939 |
| 2,226,826 | Miller | Dec. 31, 1940 |
| 2,387,660 | Hall | Oct. 23, 1945 |

FOREIGN PATENTS

| Number | Country | Date |
|---|---|---|
| 25,014 | Great Britain | 1893 |